No. 630,341. Patented Aug. 8, 1899.
J. N. GARBER.
VENTILATOR.
(Application filed Dec. 15, 1898.)
(No Model.) 3 Sheets—Sheet 1.
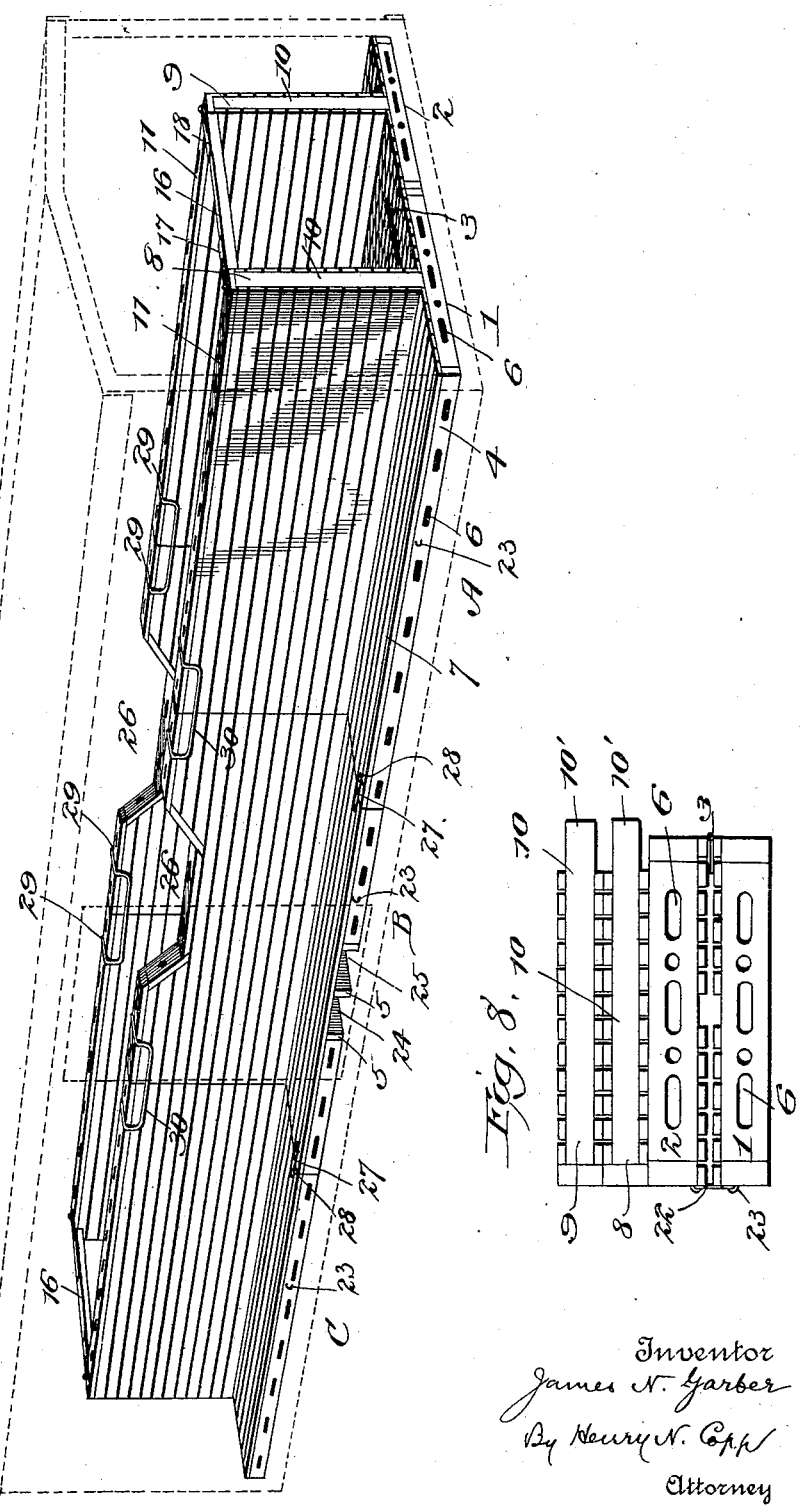
Witnesses
Inventor
James N. Garber
By Henry N. Copp
Attorney No. 630,341. Patented Aug. 8, 1899.
J. N. GARBER.
VENTILATOR.
(Application filed Dec. 15, 1898.)
(No Model.) 3 Sheets—Sheet 2.
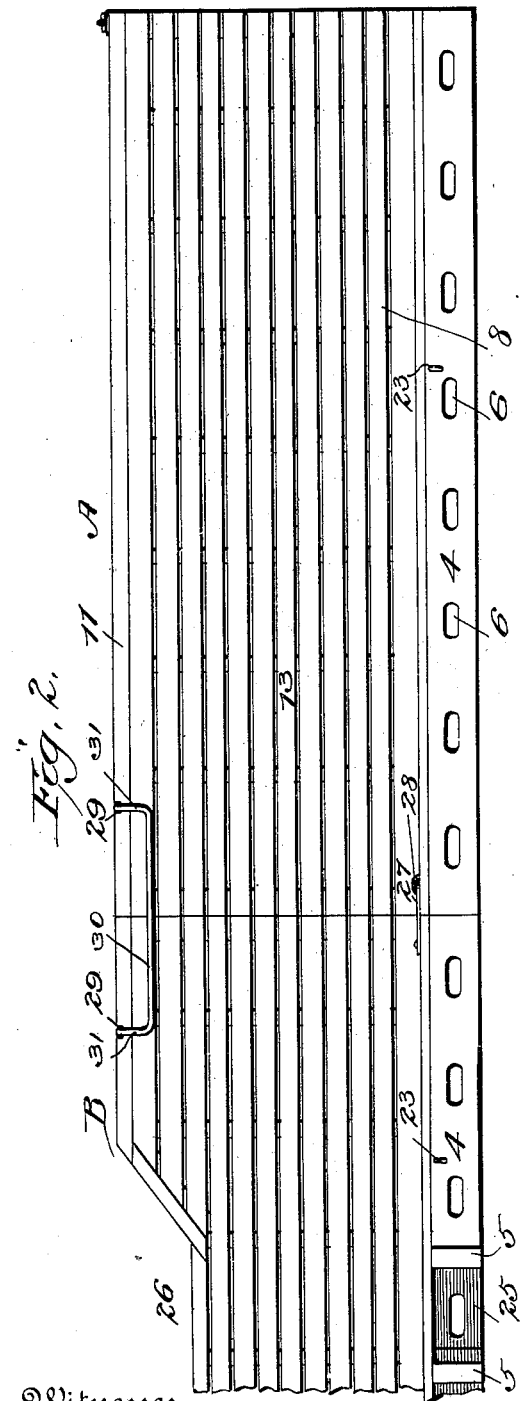
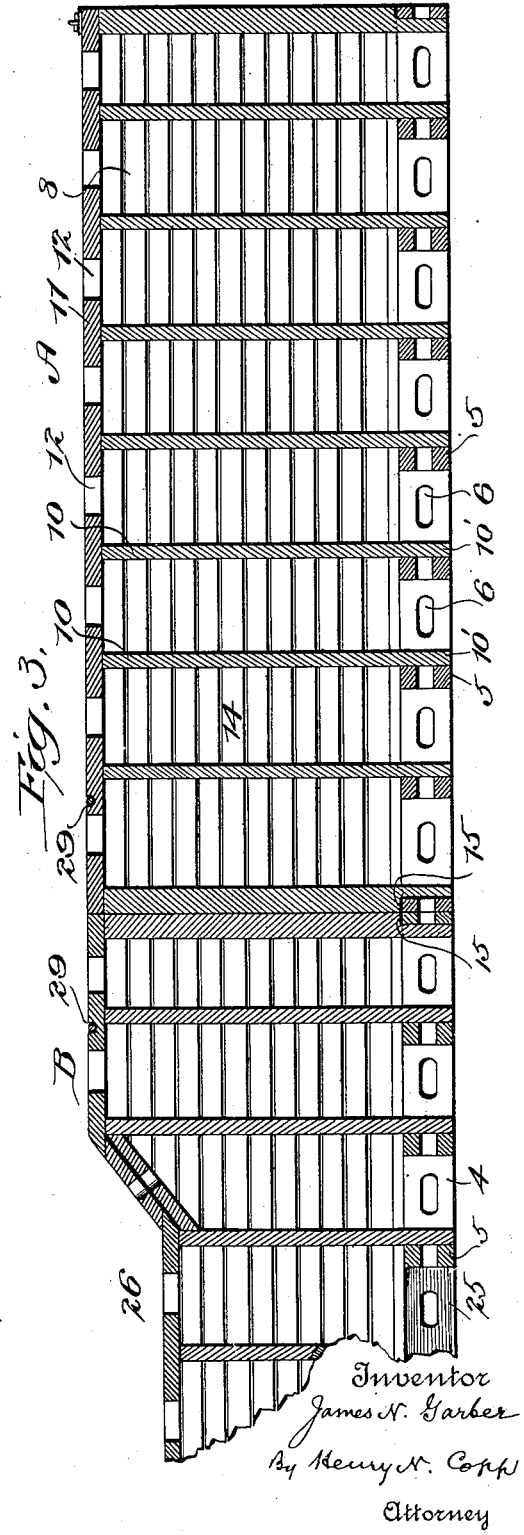
Witnesses
Inventor
James N. Garber
By Henry N. Copp
Attorney No. 630,341. Patented Aug. 8, 1899.
J. N. GARBER.
VENTILATOR.
(Application filed Dec. 15, 1898.)
(No Model.) 3 Sheets—Sheet 3.
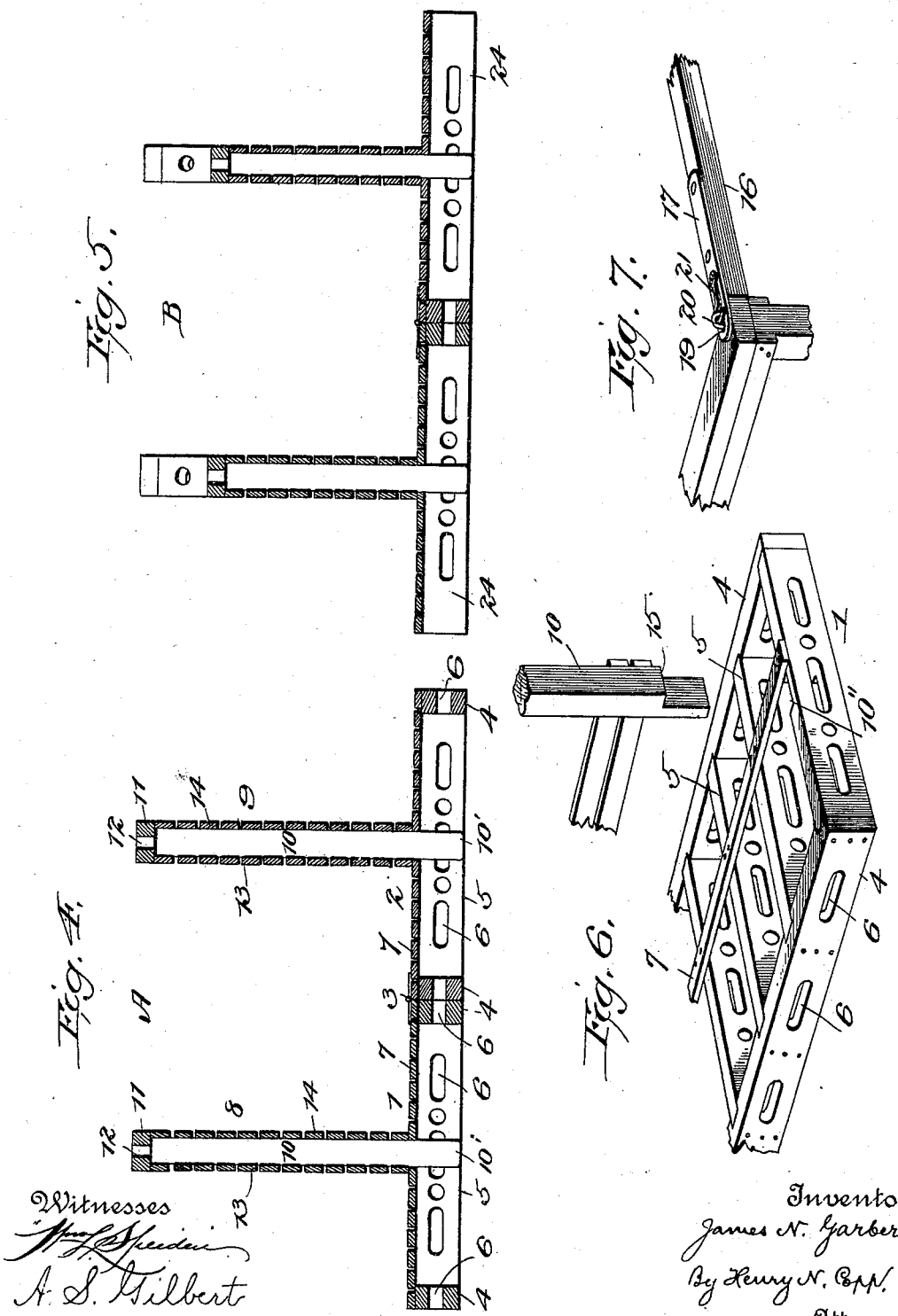
Witnesses
Wm. C. Speiden
A. S. Gilbert
Inventor
James N. Garber
By Henry N. Epp.
Attorney
THE NORRIS PETERS CO., PHOTO-LITHO., WASHINGTON, D. C.

UNITED STATES PATENT OFFICE.

JAMES N. GARBER, OF BAYS, OHIO.

VENTILATOR.

SPECIFICATION forming part of Letters Patent No. 630,341, dated August 8, 1899.

Application filed December 15, 1898. Serial No. 699,354. (No model.)

*To all whom it may concern:*

Be it known that I, JAMES N. GARBER, a citizen of the United States, residing at Bays, in the county of Wood and State of Ohio, have invented certain new and useful Improvements in Ventilators; and I do hereby declare the following to be a full, clear, and exact description of the invention, such as will enable others skilled in the art to which it appertains to make and use the same.

In storing or transporting vegetables or fruit it is essential to their preservation that they be kept at a comparatively low temperature, for otherwise their heating will cause their destruction or damage by decomposition. Vast quantities of fruit and vegetables are damaged each year because proper provision is not made for keeping them sufficiently cool and ventilated when lying in bins or sheds or while in transit in freight-cars. Proper ventilation and circulation of air through them when thus stored or while being transported are essential, and while provision has heretofore been made in this respect, particularly in freight-cars, so far as I am aware the car or bin has been specially built to accomplish the desired result, and no suitable provision has been made for the ventilation of vegetables or fruit in bins, sheds, or cars as ordinarily constructed, and as these are in more general use than the more expensive specially-built ventilating cars or bins vast quantities of fruit and vegetables are damaged or completely ruined yearly.

I propose in the present invention to provide an improved ventilating device or structure which can be applied to any shed, bin, car, or other receptacle or vehicle for storing or transporting fruit or vegetables whereby the desired ventilation and circulation of air through any and all parts of the fruit or vegetables can be obtained by natural draft without necessitating changes or modifications of any kind whatever in the bin, shed, or car to which the improved device is applied and affording a convenient, inexpensive, and easily-installed structure which will accomplish its purpose in the most satisfactory manner.

Having this object in view, the invention consists of a structure or air-circulating and ventilating system of the improved construction hereinafter set forth and claimed.

In the accompanying drawings, Figure 1 is a perspective view of my complete invention. Fig. 2 is a side elevation of the same. Fig. 3 is a longitudinal section taken through one of the vertical partitions. Fig. 4 is a transverse section through one of the end sections. Fig. 5 is a similar view through the central section. Fig. 6 is a detail perspective view showing the manner of securing the vertical partitions to the base. Fig. 7 is a similar view of one of the cross-braces and the manner of securing same. Fig. 8 is an end elevation showing the members of one section folded and laid together as for transportation.

The invention will be shown and described as adapted for use on an ordinary box or freight car used for transporting fruit or vegetables, although it is obvious it can be applied to bins, sheds, or other receptacles, as I have before stated.

There are three sections A, B, and C, which constitute the device. The end sections A and C are duplicates, and the center section differs from them but slightly. Each end section is composed of two longitudinal halves 1 and 2, hinged together at 3, so that they can be folded one on the other in compact arrangement when desired. Each half comprises a rectangular frame of timbers 4 and parallel cross-timbers 5, all of which have numerous air or ventilating slots or openings 6 and closely-spaced slats 7 extending from end to end of the frame across the top thereof. Midway the width of each hinged half one or more slats are omitted for the accommodation of projecting timbers on the ventilating-walls. The upright walls 8 and 9 each consist of regularly-spaced vertical solid timbers 10, having projecting lower ends 10', which fit in the spaces between the timbers of the respective halves 1 and 2 and against said timbers, top timbers 11, having ventilating slots or openings 12, and sets of parallel regularly-spaced slats 13 and 14, secured to opposite sides of the vertical timbers. The end vertical timbers 10 have shoulders 15, which rest on the end timbers of the base-frame and themselves fit in notches 10" in said end timbers, and the lower slats of the sets 13 and 14 also rest on the slats of the base, thus supporting and steadying the said walls. The outer ends of the walls are steadied and connected by a brace 16, which fits in between them and is provided with bars 17 and 18, having slots 19, which receive staples 20 on the top timbers of the walls, and hooks 21, pivoted to the bars, are adapted to engage the staples. One longitudinal half of each section has a hook 22 and the other longitudinal half an eye 23 for securing them together when folded upon each other.

The center section B is constructed the same as sections A and C except in the particulars I will now describe. Both longitudinal halves of section B have a portion of the outermost timber of the frame 4 omitted, thus providing the large air spaces or ducts 24 and 25 between the cross-timbers 5 at the points where the car-doors are located. At these points the air enters and ramifies the remaining parts of the structure. Instead of employing a single straight top timber for the walls, as in the end sections A and C at 11, the walls are cut out from the top downward at 26 in line with the car-doors, the top timbers 11 being provided for these cut-out portions. The cutting away of the walls of the center section is to permit more easy loading of the car.

The three sections are placed end to end, the ventilating-openings in the end timbers of the respective base-frames registering with each other and secured together by hooks 27 on the center section and eyes 28 on the end sections. To insure a rigid and proper connection of the sections, particularly the walls, the top timbers 11 are notched or grooved at 29 and fastening-loops 30 are employed. These loops are of rod-iron and of rectangular shape, with both ends turned up at 31. The loops straddle the juxtaposed wall ends, and the cross-pieces of said loops lie in the grooves 29.

The vegetables or fruit are packed on the sections, between and outside of the walls thereof, to the proper height. The air entering through the car-doors and at the bottom of the car passes into the large air-ducts in the center section and through the openings in the timbers of the base-frames, thence upward between the slats of the bases and of the walls, and through the vegetables or fruit to the top of the car and out the usual screens or openings at the ends of the latter. The constant circulation of air through the produce keeps it at a proper temperature, preventing heating and decomposition. In unloading the car the center section of the device is first unloaded, being nearest the doors, and when the walls are reached they are removed and strips or slats are inserted in the space they occupied in order to prevent the produce from falling through.

Any number of the sections can be employed, and the shapes can be varied to suit requirements, as the invention can be used in any place where vegetables, fruit, or other produce is to be stored, and I do not limit myself to the use of the precise constructions and instrumentalities herein shown and described, but consider that I am entitled to all such changes and modifications as come within the spirit and scope of the invention.

Having thus described my invention, what I claim as new, and desire to secure by Letters Patent, is—

1. A ventilator for fruit, vegetables, and other produce, comprising a portable base and upright walls which are detachably secured to the base, said base and walls being provided with ventilating air-passages, and on which the produce is to be stored, whereby the air-currents are afforded access to all parts of the produce.

2. A ventilator for fruit, vegetables, and other produce, comprising a portable base composed of separate parts hinged together so as to be foldable, and upright walls detachably connected to the base, said base and walls being provided with ventilating air-passages and on which the produce is to be stored, whereby the air-currents are afforded access to all parts of the produce.

3. A ventilator for fruit, vegetables, and other produce, comprising a ventilating-base, on which the produce is to be stored, upright ventilating-walls detachably secured to the base, and a brace extending between and detachably connected to the walls.

4. A ventilator for fruit, vegetables, and other produce, comprising a ventilating-base on which the produce is to be stored, ventilating-walls detachably connected to the base and arising therefrom, staples on the walls, and a brace fitted in between the walls and provided with bars having slots which receive the staples, and hooks adapted to engage with the staples.

5. A ventilator for fruit, vegetables, and other produce, comprising a base having a top and ventilating-openings in its sides communicating with the space beneath the top, and upright walls secured to the base, which consist of upright timbers, a top timber having ventilating-openings, and sets of separated slats secured to opposite sides of the upright timbers, the air-spaces in the walls being in communication with the air-space in the base.

6. A ventilator for fruit, vegetables and other produce, comprising a base composed of a frame having cross-timbers and a top or covering therefor and provided with ventilating-openings communicating with the space beneath the top, said covering or top having air-openings and hollow walls having ventilating-openings and provided with projections adapted to enter the spaces in the top of the base and to be disposed against the cross-timbers thereof, said walls resting on the base, whereby the walls are held in position with their interiors in air communication with the air-space of the base.

7. A ventilator for fruit, vegetables, and other produce, comprising a ventilating-base, composed of separate and connected sections, upright ventilating-walls for each base-section which are in alinement with each other, and detachable clasps or connectors securing the alined walls together.

8. A ventilator for fruit, vegetables, and other produce, comprising a ventilating-base composed of separate and connected sections, upright ventilating-walls for each base-section which are in alinement and have engaging devices, and connectors or clasps consisting of elongated loops straddling the adjacent alined ends of the walls and provided with upturned ends which bridge the respective walls and are held by the engaging devices thereon.

9. A ventilator adapted for use in cars for holding fruit, vegetables and other produce, comprising a ventilating-base and ventilating-walls arising therefrom which are cut out or depressed from their top downwardly opposite the car-doors.

10. A ventilator adapted for use in cars for holding fruit, vegetables, and other produce, comprising a ventilating-base composed of a base-frame and top, both having air-openings and the base-frame being also provided with large air-ducts leading into it at points opposite the doors of the car.

In testimony whereof I affix my signature in presence of two witnesses.

JAMES N. GARBER.

Witnesses:
C. R. PAINTER,
EDWARD M. FRIES.